Patented Jan. 27, 1953

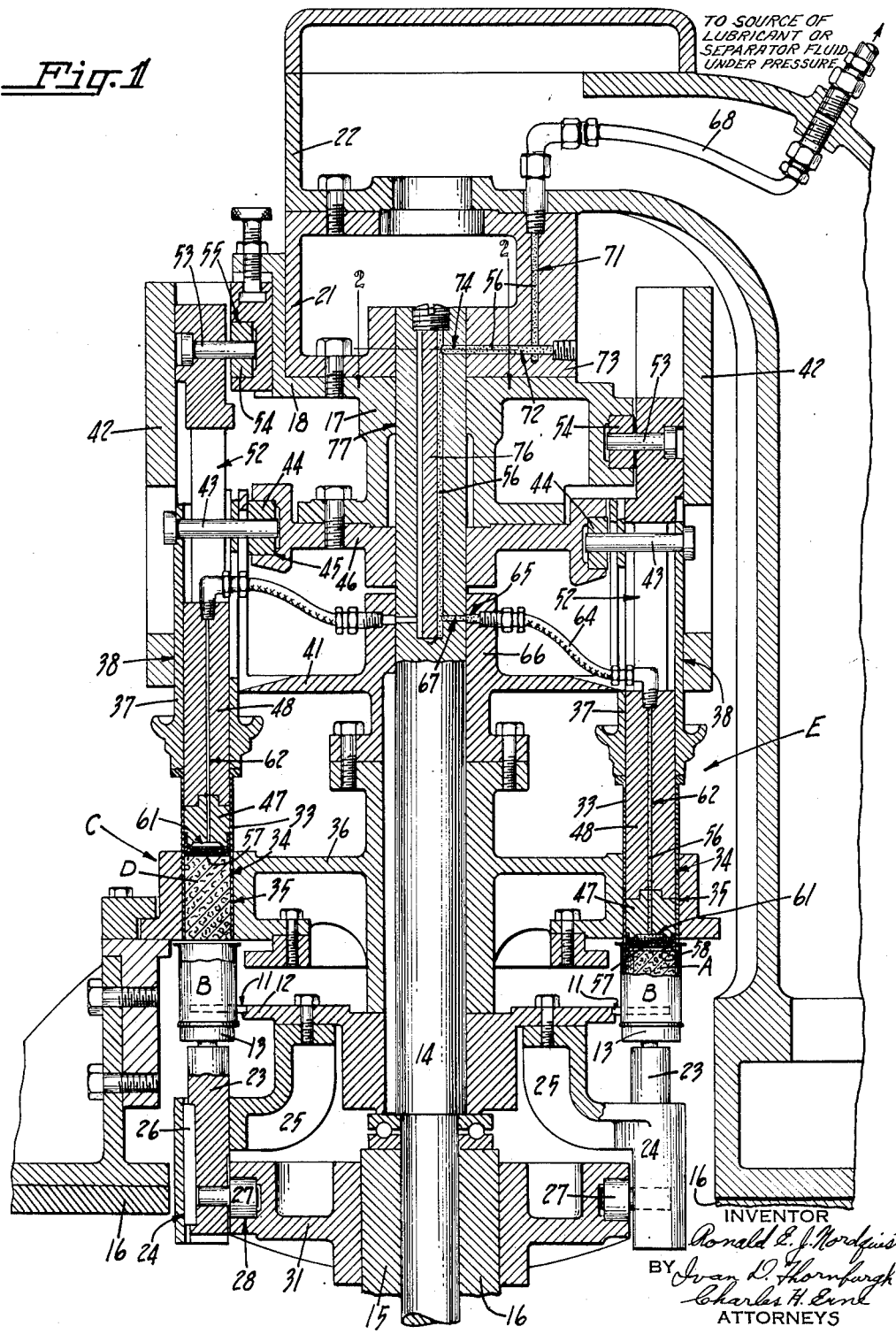

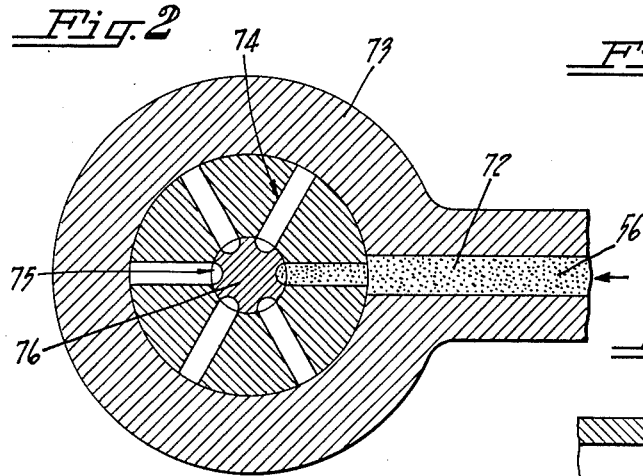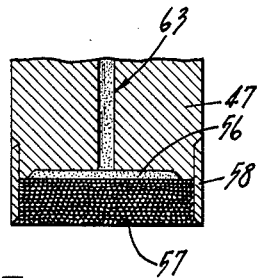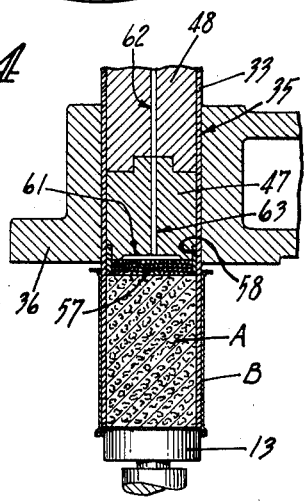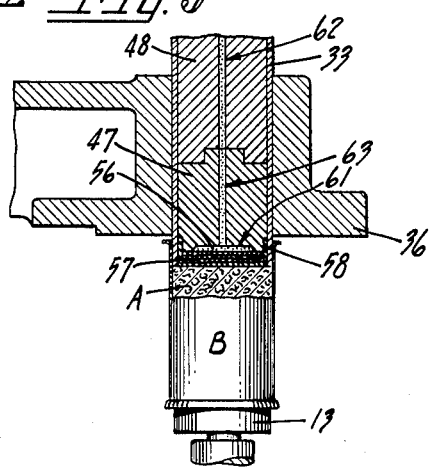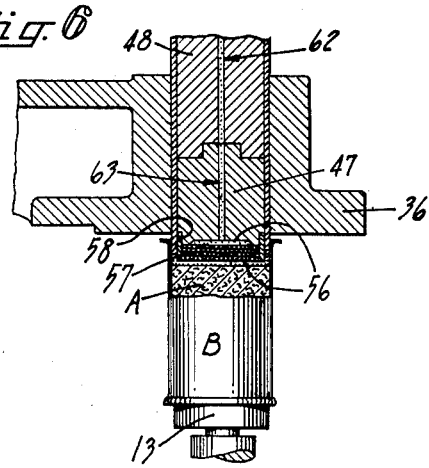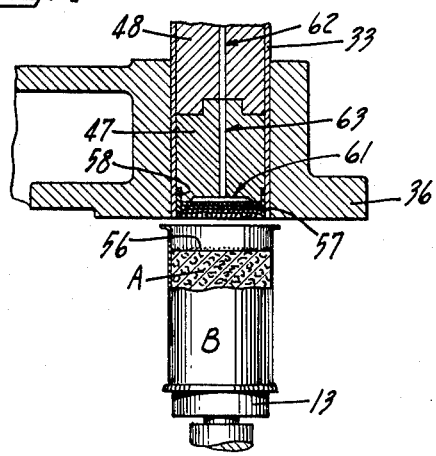

2,626,738

UNITED STATES PATENT OFFICE 2,626,738

CAN-FILLING MACHINE WITH POROUS PACKING PLUNGER

Ronald E. J. Nordquist, Maplewood, N. J., assignor to American Can Company, New York, N. Y., a corporation of New Jersey Application December 23, 1946, Serial No. 717,844

2 Claims. (Cl. 226—97)

This invention relates to container or can filling machines and has particular reference to filling soft and sticky material such as minced meat and similar products into cans in such a manner that the adherence of the product to the machine filling parts is eliminated.

In certain respects, the invention constitutes an improvement upon the can filling machine illustrated and described in United States Patent 2,336,415, issued December 7, 1943, to Ronald E. J. Nordquist and Harvey L. Bryant and provides novel means in such type of machine for preventing sticking of the product to be filled, thereby rendering the filling operation more efficient.

An object of the invention is the provision of such a machine for filling a charge of soft and sticky material such as minced meat and the like into cans, wherein the material to be filled into the can is pressed from a can entering carrier element by a plunger which is treated with a lubricant to separate the product completely from the plunger.

Another object of the invention is the provision in such a machine of a coacting carrier element and plunger for filling a soft and sticky product such as minced meat and the like into a can at one station and for withdrawing the carrier element and the plunger at a different station while oil or other suitable lubricant is applied to the face of the plunger to prevent adherence of the product to said carrier element and plunger.

Numerous other objects and advantages of the invention will be apparent as it is better understood from the following description, which, taken in connection with the accompanying drawings, discloses a preferred embodiment thereof.

Referring to the drawings:

Figure 1 is a vertical section of a can filling machine embodying the instant invention, with parts broken away;

Fig. 2 is an enlarged sectional view taken substantially along the line 2—2 in Fig 1;

Fig. 3 is an enlarged sectional detail of a plunger; and

Figs. 4 to 7 inclusive, are enlarged schematic sectional views of the can filling parts in different positions during the following the filling of the product into a can.

As an exemplary embodiment of the present invention the drawings illustrate a rotary turret type of machine for filling soft and sticky products A such as minced or spiced meat and the like into cans B to which a cover is applied after filling in the conventional manner.

The cans B to be filled with the product are introduced into the machine from any convenient source. The cans are introduced into the machine and enter pockets 11 (Fig. 1) of a rotating can filling turret 12, to be carried on can lifter pads 13 located in alignment with said pockets.

The filling turret 12 (Fig. 1) is mounted on and keyed to a vertical shaft 14 journaled at its lower end in a bearing 15 formed in the machine frame 16 and at its upper end in a bearing 17 formed in a stationary barrel cam 18. This cam is secured to a spacer block 21 which is bolted to an overhanging column bracket 22 which in turn is mounted on the machine frame. The shaft 14 is rotated from its lower end in any suitable manner.

The turret 12 is formed with a plurality of the can pockets 11 equally spaced around its periphery, each pocket having a can support or can lifter pad 13. These can lifter pads are secured to the upper ends of vertically movable stems 23 which slide in bearings 24 formed in brackets 25 bolted to the bottom of the turret 12. A key 26 in each stem retains the stem against turning in its bearing. The lower end of each stem carries a cam roller 27 which operates in a cam groove 28 of a stationary barrel cam 31 secured to the shaft bearing 15.

Hence as the shaft 14 rotates, it revolves the turret 12 and the can lifter pads 13 as a unit, while the cam rollers 27 traverse the cam groove 28 and thus carry the cans deposited in the turret pockets through a circular path of travel through various stations around the shaft. During this travel each can moves into position at a station C (Fig. 1) to receive a measured charge of meat product to be filled into the can.

The meat to be filled into the cans B is delivered to the instant filling machine in any suitable manner, for example in the manner shown in said U. S. Patent 2,336,415. The meat as it is received preferably is measured into accurate charges before being filled into the cans. This measuring of the meat is effected by a suitable filling mechanism such as by movable tubular carrier elements 33 formed with thin walls and having an opening at its top and bottom ends.

The interior of the tubular carrier element provides a measuring chamber 34 which constitutes a carrier for the meat product. There is one of these measuring carrier elements for each pocket 11 of the filling turret 12 and is carried directly above its pocket in vertical alignment with a can B in the pocket.

The outside dimensions of the tubular carrier element are slightly smaller than the inside dimensions of a can B so that the carrier containing a measured charge of meat may pass readily into a can, as will be hereinafter described. The carrier elements 33 are located in vertical slideways 35 formed in a measuring disk 36 which is keyed to and is rotated by the vertical turret shaft 14. This disk and the measuring carrier elements carried thereon are rotated in time with the filling turret 12 while the carrier elements are maintained in vertical alignment with the cans in the turret pockets.

Each carrier element 33 is secured at its upper end to an actuating sleeve 37. This actuating sleeve is mounted in a vertical slideway 38 formed in a disk 41 keyed on to the shaft 14 and bolted to the measuring sleeve disk 36 and together comprises a rotatable structure.

Retainer plates 42 are secured to the outer periphery of the disk 41 and confine the actuating sleeves 37 within their slideways. The upper ends of the actuating sleeves carry pins 43 which extend inward and carry cam rollers 44. Cam rollers 44 operate in a cam groove 45 of a stationary barrel cam 46 which surrounds the shaft 14 and which is bolted to the bottom of the barrel cam 18.

Thus as the rotating shaft 14 rotates the disks 36, 41 the cam rollers 44 traverse the cam groove 45 of the stationary cam 46. This movement of the rollers along the cam groove imparts a vertical movement to the actuating sleeves 37 and these sleeves raise and lower the carrier elements 33 relative to the can as they move around their circular path of travel.

Within each measuring chamber 34 there is disposed a vertically movable plunger 47 which is secured to the lower end of a plunger rod 48. The plunger rod extends up through the actuating sleeve 37 and is formed with an elongated clearance slot 52 through which the cam roller pin 43 passes. The upper end of the plunger rod 48 carries a pin 53 which extends inwardly, carrying a cam roller 54 at its inner end. Cam roller 54 operates in a cam groove 55 of the stationary barrel cam 18. This cam actuates the plunger rod and its plunger 47 vertically within its tubular carrier element 33 in time with the rotation of the shaft 14 to effect the discharge of the measured meat product into the cans.

Just prior to an empty can being moved into position to receive a measured charge D of the meat as best illustrated at station C (Fig. 1), the can is lifted upwardly directly under the filled measuring chamber 34. As the measuring disk 36 and the can turret 12 continue to rotate, the carrier element 33 and the plunger 47 move down as a unit into the can B. This action carries the meat down into the can. The carrier element with the plunger and the meat continues to descend into the can until the carrier element or sleeve strikes the bottom of the can, as best illustrated in Fig. 4.

Upon striking the bottom of the can the sleeve 33 begins to withdraw or move upwardly while the plunger 47 continues to move down. This action pushes the meat product out of the carrier element and presses it downward against the bottom and the sides of the can and into the space previously occupied by the carrier element. The plunger thereupon ceases its downward movement and begins to move upwardly with the carrier element. The plunger during this action strips the meat product from the carrier element (Fig. 5).

In order to effect a clean breaking away of the meat from the plunger 47, provision is made to lubricate the lower face of the plunger preparatory to the withdrawal of the carrier element 33 and the plunger 47 from the filled can as the latter approaches the station E in the machine (Fig. 1). For this purpose a porous bottom facing is provided in each plunger 47 (Fig. 3) through which a suitable lubricant or separator fluid such as oil or the like 56 may be forced to prevent adhesion of the minced meat product to the plunger.

The porous bottom facing of the plunger 47 may be formed from any suitable material which has the proper porosity for filtering, diffusing or distributing in a controlled manner the lubricant which is chosen for preventing adherence of the product to the product contacting machine parts. A preferred example of material suitable for these purposes is a porous metal known commercially as "Porex" marketed by Moraine Products Division of General Motors Corporation. This particular metallic porous material combines a number of desirable characteristics such as freedom from impurities, corrosion resistance, temperature resistance, tensile strength, ductility and machinability.

The structure and method of manufacture of metallic porous material of this type is disclosed in Patent No. 2,273,589 issued to Richard G. Olt and assigned to General Motors Corporation. As explained in this patent the products resulting from this method are "highly porous metal articles capable of permitting fluid flow therethrough wherein the porosity of the articles may be closely controlled." Spherical powder particles of metal, such as copper, are coated with another metal of lower melting point, such as tin, and upon sintering a mass of these coated spherical particles, "the tin further diffuses into the copper and also bonds adjacent particles by an alloy bond." It is also stated in this patent that the use of such spherical particles produces uniformity and greater porosity in the finished article.

As shown in Figs. 1 through 4 of this patent, the structure of such porous metal consists of numerous spherical particles of metal powder each bonded at spaced points on its surface to neighboring spherical particles. The interstices between these bonded spherical particles thus provide numerous minute sinuous and intercommunicating pores or passages through the mass. Fluid, such as oil, when forced under pressure through these minute passages, would therefore be filtered as it is diffused or distributed through the porous metal mass. Because some of the intercommunicating passages at the inlet side of the mass may be blocked in the filtering operation, numerous alternative intercommunicating passages provide means for the liquid to be fully distributed throughout the mass to the other outer surfaces.

A facing member or plate 57 formed from the above material is secured to the lower face of the plunger in any suitable manner such as by means of a band 58 welded to the plunger 47. Oil under pressure is fed into a recess 61 formed in the lower end of the plunger (Figs. 3 and 5) for the purpose of bleeding-in oil through the minute sinuous and intercommunicating passages of the porous plate 57.

Oil 56 is supplied to the recess 61 through suitable openings 62, 63 formed in the plunger rod 48 and in the plunger 47. Each of the plunger rods is individually connected through a suitable flexible connection 64 to one of a series of openings 65 in the bearing 66 of the disk 41 (Fig. 1). Each of the openings 65 is positioned to register with an opening 67 extending inwardly in the shaft 14 from which the respective plungers intermittently receive their supply of oil.

The oil 56 is supplied to the shaft 14 from a convenient outside source. This may include a continuous flow of oil under pressure or a mixture comprising a fluid and oil such as air and oil, gas and oil or a combination of all three. A supply of oil or the mixture as just described is forced through a suitable inlet connection 68 to passages 71, 72 formed in the spacer block 21 (Fig. 1).

The passage 72 (see also Fig. 2) extends inwardly in a bearing 73 in the block 21 and has registration with radial openings 74 formed in the upper end of the shaft 14. The individual radial openings 74 register with vertical grooves 75 formed in a vertically disposed stem 76 located or secured in a bore 77 in the upper end of the shaft 14. Thus as the respective radial openings 74 move into registration with the opening 72 oil is fed to the respective grooves 75 and thence through openings 67 in the shaft which are in registration with the openings 65 in the bearing.

Hence, as the oil or the mixture 56 as just described is fed to the recess 61, the oil is forced through the sinuous passages of the porous plate 57 and a bleeding-in treatment of the plunger face takes place at station E which produces a separating film of the oil between plunger and product (Figs. 1 and 6). This separates the meat product from the plunger and from the lower edge of the carrier element completely as the plunger and the carrier element continue their retracting movement from the filled can leaving a light film of the liquid 56 on the product (Fig. 7). The plunger 47 and the carrier element 33 thereupon return to their original position flush with the bottom of the disk 36 (Fig. 7) in readiness for a subsequent filling operation.

The filled can is thereupon lowered away from the bottom of the disk 36 as it continues along its path of travel to its original level for discharge from the machine in any suitable manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling containers with a sticky product such as minced meat and the like, the combination of a plunger element for pressing the product into a container, a plate of porous metal carried on said plunger element and having a lower product contacting surface, said porous metal consisting of numerous small spherical particles bonded together and forming between them minute sinuous and interconnecting passages extending from minute openings on each surface of said plate to similar openings throughout every other surface thereof, fluid conducting means in said plunger element and leading to the upper surface of said plate, and means for connecting and disconnecting said fluid conducting means at timed intervals with a source of separator fluid under pressure to the minute sinuous and intercommunicating passages of said porous metal plate in time with the movement of said plunger element for filtering the liquid and for distributing it as a film between said product contacting surface of said plate and the surface of the product to prevent said product from sticking to said plate when said plunger is withdrawn from the filled container, said minute sinuous passages of the plate also checking the flow of fluid when the pressure on the fluid is discontinued, and the minute passage openings on said product contacting surface of the plate substantially preventing blockage of the passages by particles of the product.

2. In a machine for filling containers with a sticky product such as minced meat and the like, the combination of means for aligning containers with a carrier element filled with said product, said carrier element being insertable into an aligned container for filling the container with the product, a plunger element mounted inside of said carrier element and having movement therein to enter the top of a filled container and press the product below the top edge of the container, a plate of porous metal on said plunger element, said plate having a lower product contacting surface and a contiguous peripheral wall, said porous metal consisting of numerous small spherical particles bonded together and forming between them minute sinuous and interconnecting passages extending from minute openings on each surface of said plate to similar openings throughout every other surface thereof, a band surrounding and closely confining said peripheral wall of the plate to support said plate and to stop the minute openings in said peripheral wall, and means for periodically forcing a separator fluid under pressure to the upper surface of said plate and through the minute sinuous and intercommunicating passages of said plate in time with the movement of said plunger element for filtering the fluid and for distributing it as a film between said product contacting surface of the plate and the surface of the product to prevent said product from sticking to said plate when said plunger is withdrawn from the filled container, said minute sinuous passages of the plate also checking the flow of fluid when the pressure on the fluid is discontinued, and the minute passage openings on said lower surface of the plate substantially preventing blockage of the passages by particles of the product.

RONALD E. J. NORDQUIST.

REFERENCES CITED

The following references are of record in the file of this patent:

UNITED STATES PATENTS

| Number | Name | Date |
| --- | --- | --- |
| 228,969 | Johnson | June 15, 1880 |
| 260,101 | Judson | June 27, 1882 |
| 493,897 | Robertson | Mar. 21, 1893 |
| 1,099,114 | Bracy | June 2, 1914 |
| 1,497,191 | Moland | June 10, 1924 |
| 1,991,656 | Campbell | Feb. 19, 1935 |
| 2,026,940 | Hendryx | Jan. 7, 1936 |
| 2,307,055 | Menger et al. | Jan. 5, 1943 |
| 2,336,415 | Nordquist et al. | Dec. 7, 1943 |